United States Patent [19]

Holzschuh

[11] Patent Number: 5,078,586
[45] Date of Patent: Jan. 7, 1992

[54] ARRANGEMENT FOR SECURING A DIE TO A DIE HOLDER

[75] Inventor: Johann Holzschuh, Meinerzhagen, Fed. Rep. of Germany

[73] Assignee: Battenfeld GmbH, Meinerzhagen, Fed. Rep. of Germany

[21] Appl. No.: 579,873

[22] Filed: Sep. 7, 1990

[30] Foreign Application Priority Data

Sep. 7, 1989 [DE] Fed. Rep. of Germany ....... 3929717

[51] Int. Cl.⁵ .................. B29C 33/00; B29C 45/26; B29C 45/17; B23Q 3/02
[52] U.S. Cl. .................. 425/192 R; 29/450; 72/481; 100/918; 425/195
[58] Field of Search .................. 425/193, 195, 192 R; 403/245, 324, 338; 411/354; 72/481; 29/450–453.5; 100/918

[56] References Cited

U.S. PATENT DOCUMENTS

| 4,348,165 | 9/1982 | Vostrovsky | 425/192 R |
| 4,544,340 | 10/1985 | Hehl | 425/192 R |
| 4,655,275 | 4/1987 | Wörner | 100/918 |
| 4,684,101 | 8/1987 | Wagner et al. | 425/193 |

FOREIGN PATENT DOCUMENTS

| 2103943 | 7/1979 | Fed. Rep. of Germany | 100/918 |
| 3331676 | 3/1985 | Fed. Rep. of Germany | 100/918 |
| 0107760 | 6/1984 | Japan | 164/341 |

Primary Examiner—Willard E. Hoag
Attorney, Agent, or Firm—Toren, McGeady & Associates

[57] ABSTRACT

An arrangement for securing a die to a die holder for use as a molding die in an injection molding machine permits the die to be oriented on the die holder in a number of different angularly rotated positions. Clamping bolts secured to the die extend perpendicularly of a contacting plane between the die and die holder and project into corresponding holes in the die holder. Slides are provided in passageways in the die holder with the passageways extending parallel to the contacting plane. The slides are displaceable in the passageways into securing and clamping engagement with the clamping bolts. The slides are wedge-shaped and interengage corresponding wedge-shaped recesses in the outer surface of the clamping bolts. The slides can be displaced by actuating members. Hydraulic piston cylinder units can be used as the actuating members for holding the slides in the clamped position during operation. The recesses in the clamping bolts are formed by circumferentially extending secant-like cuts in the outer surface of the bolts with the cuts having a wedge-shape corresponding to the wedge-shaped slides.

4 Claims, 3 Drawing Sheets

ARRANGEMENT FOR SECURING A DIE TO A DIE HOLDER

BACKGROUND OF THE INVENTION

The present invention is directed to an arrangement for securing dies to die holders for use as a molding die in an injection molding machine with clamping bolts positioned in the die and extending perpendicularly through an attachment plane provided by contacting surfaces of the die and die holder. The clamping bolts extend perpendicularly to the attachment plane and are arranged in pairs. The bolts project into corresponding holes in the die holder with a device for locking the die to the holder. The locking device includes passageways extending through the die holder from its outside lateral peripheral into the holes for the clamping bolts. Slides extend through the passageways into engagement with the clamping bolts. The slides are wedge-shaped and the clamping bolts have recesses into which the slides fit in locking engagement. Hydraulic piston units, mounted in the passageways, insert the slides into the recesses and hold the slides in the locking or clamping position during operation.

In a known clamping device of this type, disclosed in EP-PS 0 088 100, at least two and preferably four clamping bolts, extending perpendicularly to the contact plane between the die and the die holder, are provided on the rear side of the die for injection molding machines. Each of the clamping bolts has a hole extending transversely through it into which a wedge-shaped slide can be inserted when the clamping bolts are inserted into holes in the die holder. This known attachment arrangement is advantageous to the extent that the molding space between the dies is unencumbered by attachment means for the dies and the die or mold travel can be kept as small as possible with the attachment parts located on the front face of the die holder. There is the disadvantage, however, that the dies can be fastened to the die holder in only two positions turned through 180° around their axes, if the quantity of attachment arrangements at the die holder corresponds to the number of clamping bolts on the rear side of the die.

SUMMARY OF THE INVENTION

Therefore, the primary object of the present invention is to provide an arrangement for securing a die to a die holder which permits the securement of the die in a number of angularly rotated positions relative to the die axis with such positioning being effected without any problems and with small technical effort.

In accordance with the present invention, recesses are provided in the clamping bolts formed by secant-like circumferentially extending cuts in the outer surface of the bolts with the recesses or cuts being shaped to conform to the wedge-shape of the slides.

One advantage of this arrangement is that the circumferentially extending cuts in the clamping bolts are formed to have a predetermined alignment with respect to the securing means positioned in the die holder in each of the angularly rotated positions of the die for assuring satisfactory gripping or clamping of die to the holder.

Another feature of the invention involves the formation of the recess by combining two circumferentially extending cuts with the inner surface of each cut forming a rectilinear planar surface forming in combination a corner angle corresponding to the corner angle of the side surfaces of the die holder containing the passageways for the slides.

If, for example, the die holder and the die each comprise a square or rectangular peripheral shape then the two circumferential cuts are arranged so that in each clamping bolt the cuts each form a rectilinear planer surface disposed at right angle to the other. This arrangement permits the die to be connected with the die holder in four different positions each rotated through 90° relative to the others around the tool bit axis, if the wedge-shape at the free ends of the slides extend transversely to the long axis of slides.

In another embodiment of the securing arrangement, each clamping bolt has a circumferentially extending cut having an open side facing the adjacent corner of the die holder containing the passageways for the slides and with the cut having a rectilinear inner planar surface oriented at right angles to the bisector passing through the corner of the holder. In this arrangement the wedge-shaped surface at the free end of the slides is inclined relative to the axis of the slide and corresponds to a similar surface in the circumferentially extending cut in the clamping bolt.

In this embodiment a die with a square or rectangular transverse section can be secured to the die holder in four positions each turned 90° relative to one another around the axis of the die.

Another feature of the invention is that the circumferential cuts have a trapezoidal shape with a surface located closer to the contacting faces of the die and the die holder extending parallel to the contacting faces. The surface of the cut spaced more remote from the contacting faces, however, is inclined relative to the contacting faces.

Due to the construction of the slides, a clamping force component, extending substantially at right angles to the contacting face of the die holder, can be exerted upon the die.

In addition, at least one hole is assigned to each of the peripheral side surfaces of the die holder and at least one clamping bolt is assigned to each of the corresponding peripheral surfaces of the die with the holes and the olamping bolts arranged so that the die can be positioned relative to the die holder in different angularly rotated po itions.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
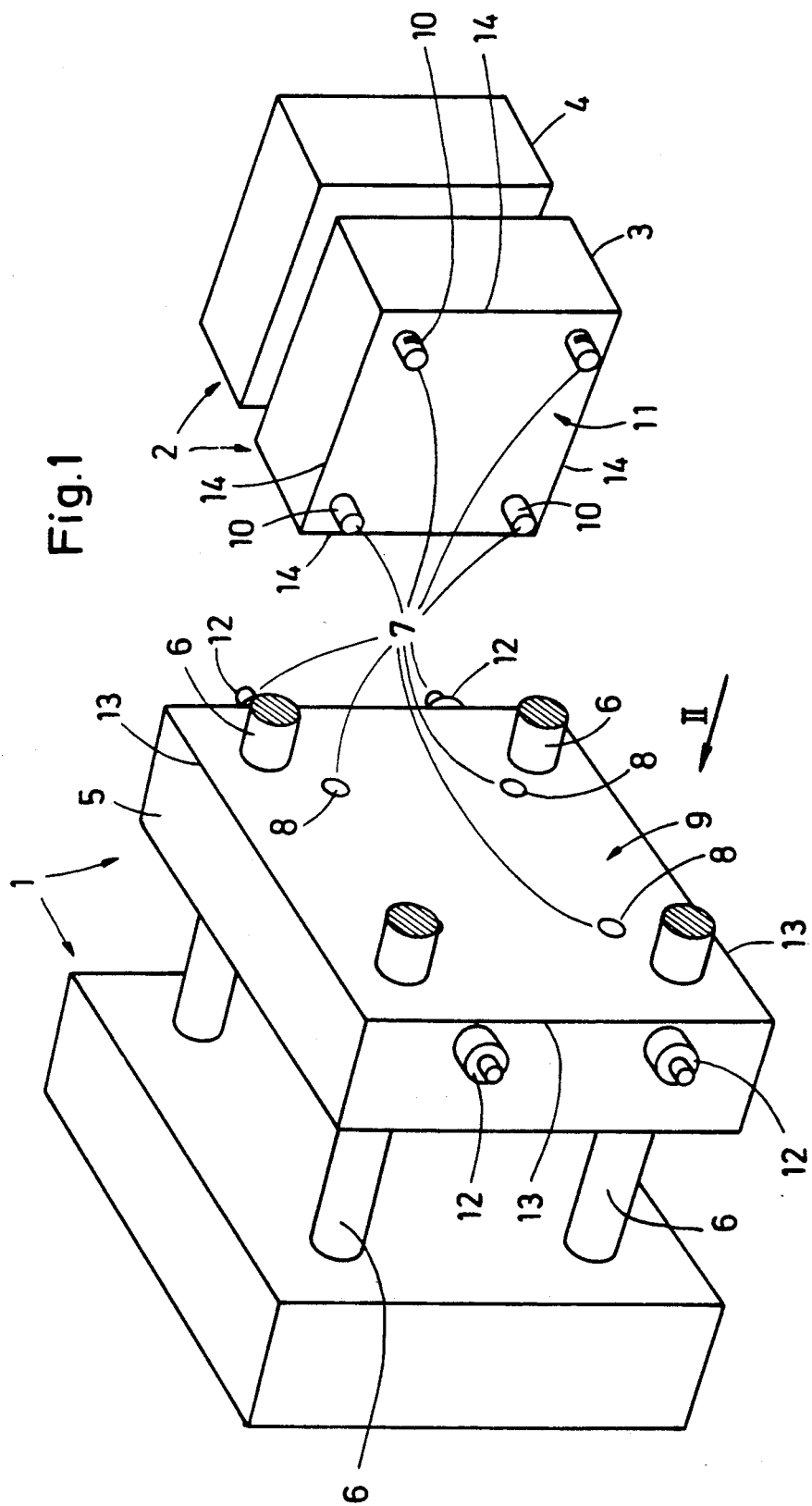
FIG. 1 is a partial perspective view of an arrangement in an injection molding machine with a die holder seated on guide columns and a die half of an injection molding die arranqed to be seoured to the die holder.

A part of a closing or locking unit 1 for an injection molding machine is shown in FIG. 1 illustrating an arrangement for securing a die 2 to a die holder 5, that is, the injection molding die 2 can be secured to the unit 1. The closing or locking unit 1 is a made up of two die holders 5 for receiving dies or die halves 3 and 4 of the die 2. For reasons of simplicity, only one half die holder 5 is shown for a die half 3 in FIG. 1, however, in the following description the half holder is characterized as a die holder 5 and the half die is designated as a die 3. In the die carrier 5 in FIG. 1 a mobile die carrier is shown for the closing or locking unit 1 and is secured on guide columns 6.

The die holder of the unit 1, not illustrated, to which the die half 4 is attachable, is a stationary die holder of the unit.

While two securing devices 7 are used for attaching the dies 3 and 4 to the unit 1, for reasons of simplicity only one of the securing devices 7 is displayed in FIG. 1.

In FIG. 1 the securing device 7 holds the die 3 on the holder 5. The securing device for the other half of the die 2 is not illustrated. The securing device for the die holder for each of the dies 3 and 4 is basically the same.

Each securing device 7 has four holes 8 or circular cross section in the die holder 5 with the holes extending inwardly from a contacting face 9 of the holder 5 arranged to contact a face 11 on the die 3. In addition, the securing device includes a number of clamping bolts 10 mounted in the die 3 and extending from its contacting face 11 with the bolts arranged in a pattern corresponding to the pattern of the holes 8. With the clamping bolts 10 extending into the holes 8, the device 7 also include a locking unit 12 mounted in a passageway in the die holder 5 with the passagewa extending parallel to the contacting face 9.

The securing devices and their cooperating parts, that is, holes 8, clamping bolts 10, and locking arrangements 12 are shown in FIG. 1 in a simplified schematic manner. In spite of this, it can be clearly noted from FIG. 1 that the functional parts of the securing devices 7 at the die carrier 5 and the die 3 are arranged in pairs. For example, the die holder 5 of the closing unit 1 coacts with the die 3 of the molding die 2 by means four identical securing devices 7.

The securing devices 7 are arranged so that two holes 8 are assigned to each of the four peripheral side surfaces 13 of the die holder 5 with the side surfaces extending at right angles to one another. As a result, each hole 8 is located upon a bisector of a corner angle formed by two adjacent side surfaces 13. All of the holes 8 have the same spacing from the side surfaces 13 of the die holder 5 assigned to them as well as from the adjacent corner.

Clamping bolts 10 of the securing devices 7 project outwardly from a rear surface 11 of the die 3, that is the surface which contacts the front surface 9 of the die holder 5 and are shaped complementary to the holes 8 whereby the clamping bolts are assigned in pairs to each of the peripheral side surfaces 14 of the rectangular or square die 3. Again, as a result, the clamping bolts lie on a bisector of the adjacent corner angle.

The arrangement of the holes 8 in the contacting face 9 of the die holder 5 and the corresponding arrangement of the clamping bolts 10 in the contacting surface 11 of the die 3 is selected so that the die 3 can be placed in plugged in connection with the die holder in four different mounting positions each rotated through 90° around a central axis extending through the contacting surfaces 9, 11 of the die holder and the die.

Figure 2:
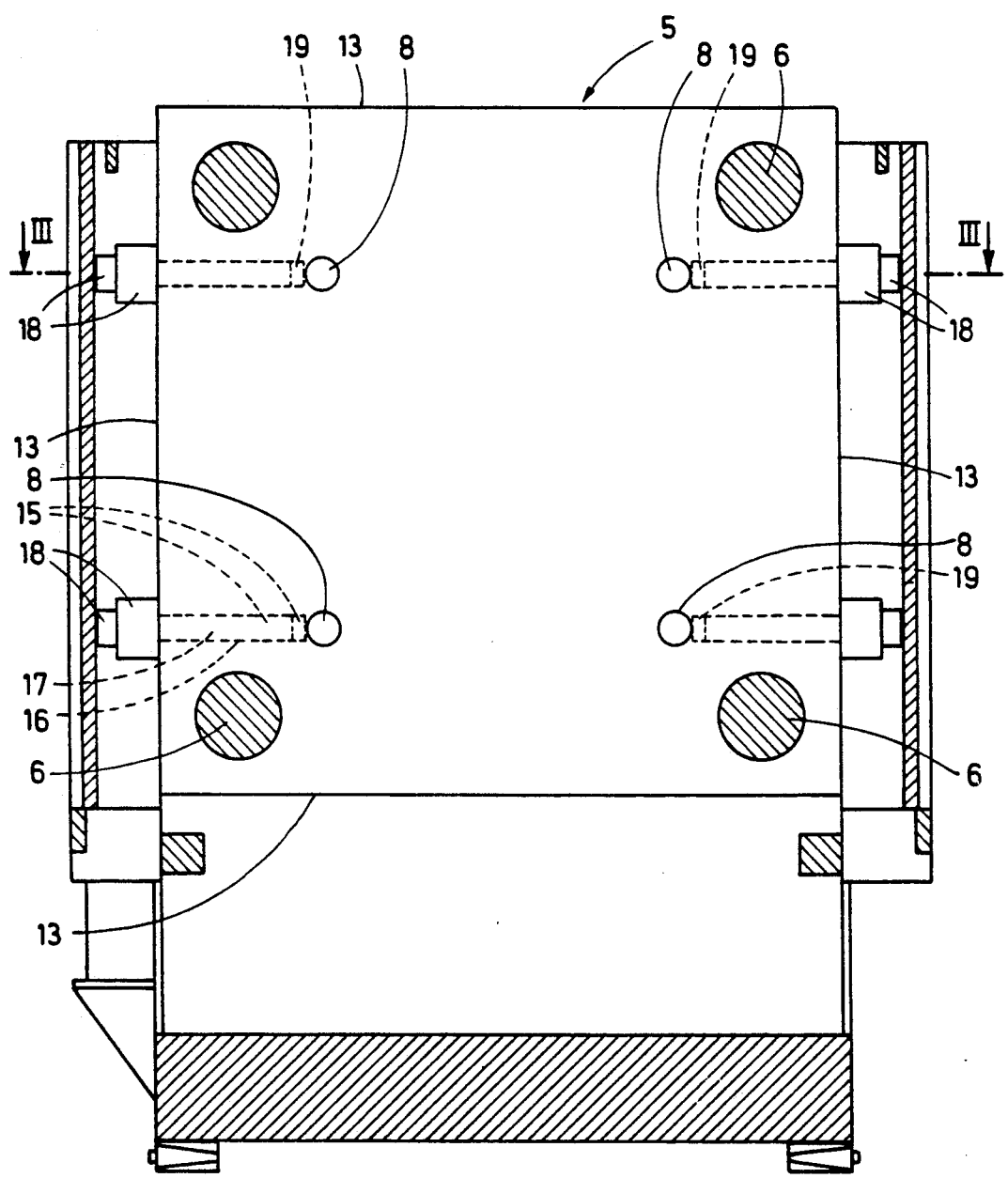
FIG. 2 is an elevational view on an enlarged scale taken in the direction of the arrow II in FIG. 1.

For securely fastening the die 3 to the die holder 5, each securing device 7 includes a locking unit 12. Each of the locking units 12, as can be noted in FIGS. 2 and 3, comprises a slide 15 positioned in a passageway 16 in the die holder 5. The passageways 16 can be formed as a bore extending parallel to the contacting surface 9 of the die holder terminating at one end in one of the holes 8 and at the other end in one of the side surface 13 of the tool holder 5.

Slide 15 is located at the inner end of a piston rod 17 of an actuation member 18 located at and projecting outwardly from the side surface 13 of the die holder 5. Actuation member 18 can be formed as a hydraulic piston cylinder unit.

Figure 3:
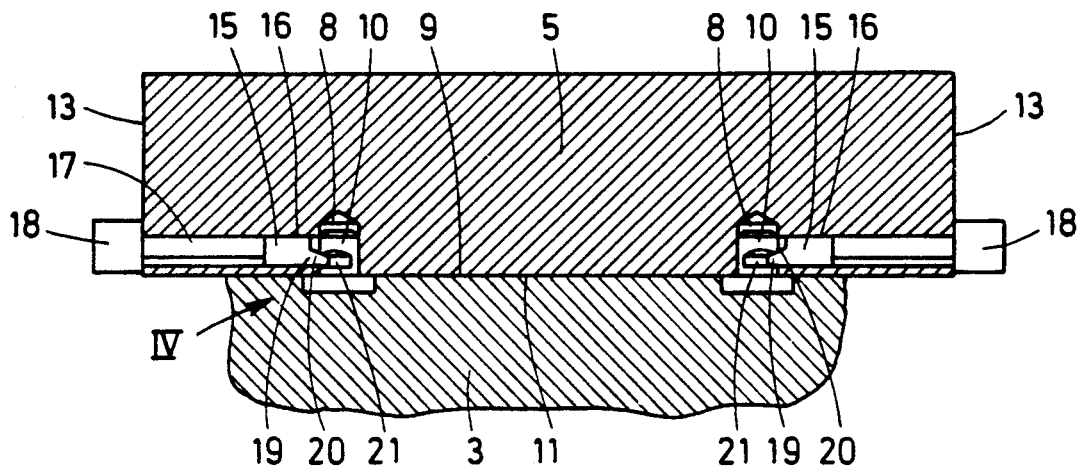
FIG. 3 is a sectional view taken along the line III—III in FIG. 2 extending through the die holder and illustrating a portion of the die half shown in FIG. 1.
Figure 4:
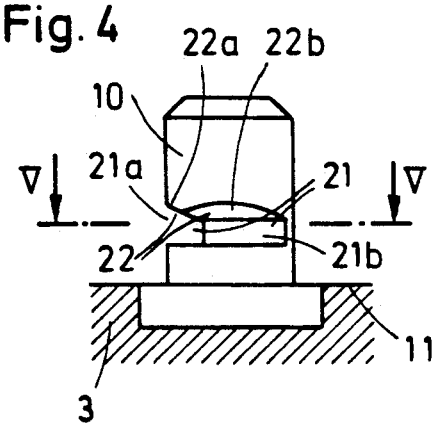
FIG. 4 is a partial view, on an enlarged scale, of the die showing the clamping bolts designated by IV in FIG. 3.

As can be seen in FIG. 3, each slide 15 has a wedge-shaped extension 19 at its end facing toward the hole 8. Preferably, the wedge-shaped extension 9 has a trapezoidal section with its side surface located closer to the contacting face 9 extending parallel to that surface and the opposite surface 20 providing the wedge-shaped configuration spaced more remotely from the contacting face 9 and being inclined with respect to the axis of the slide 15, that is, the axis of the passageway containing the slide.

Each slide 15 with its wedge-shaped extension 19 can be moved by the actuating member 18 into the assigned hole 8 in the die holder 5, as shown in FIG. 3. The wedge-shaped extension 19 cooperate with a recess 21 in the clamping bolts 10 within the hole 8, to lock the die 3 to the die holder 5 and to press the contacting face 11 against the contacting face 9 of the die holder.

As displayed in FIG. 3, but more particularly in FIGS. 4–7, the recesses 21 in the clamping bolts 10 are formed of circumferentially extending secant-like cuts with the shape of the cuts matched to the configuration of the wedge-shaped extensions 19 of the slides 15 affording a locking interengagement between the slides and the recesses.

Each recess or circumferentially extending cut 21 has a surface 22 inclined relative to the axis of the bolt 10 and matching the inclined position of the surface 20 of the wedgeshaped extension 19.

By moving or displacing the slides 15 and their wedge-shaped extensions 19 into the recesses or cuts 21, the die is tightly clamped against the die holder 5, as long as the actuating members or hydraulic piston cylinder units 18 are acted upon by hydraulic pressure during operation.

Figure 5:
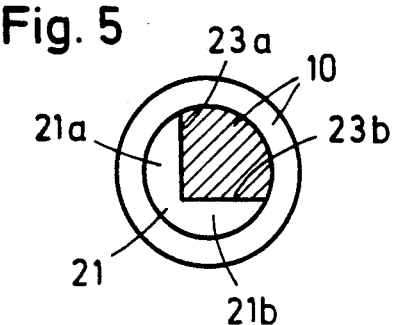
FIG. 5 is a sectional view taken along the line V—V in FIG. 4.

For securely locking the die 3 to the die holder 5 in four different positions rotated angularly 90° to one another using only four actuating members 18, special measures have been taken at the clamping bolts 10 of the die 3 of the molding die 2 as well as at the locking units 12 of the die holder 5. As shown in FIG. 3 and more particularly in FIGS. 4 and 5, each recess 21 in clamping bolt 10 is formed by two secant-like cuts 21a, 21b extending circumferentially in the outer surface of the bolt. Each cut has a planar inner boundary surface 23a, 23b extending perpendicularly of the contacting surface 11, as shown in FIG. 5. These planar surfaces 23a, 23b intersect and form a corner angle corresponding to the corner angle between two adjacent side surfaces 14 of the die 3 and also corresponding to the corner angle between the side surfaces 13 of the die holder 5 containing holes 8 for receiving the clamping bolts 10. The wedge-shaped extension 19 at the inner end of the slide 15 and serving for the locking engagement, extends transversely of the slide or passageway axis.

Depending upon the installed position of the die 3 on the die holder 5, the wedge-shaped extension 19 of the slide 15 cooperates with the circumferential cut 21a or the other circumferential cut 21b in the corresponding clamping bolt 10 for securing the die 3 to the die holder 5 by means of the contacting engagement of the inclined surfaces 20, 22.

Figure 6:
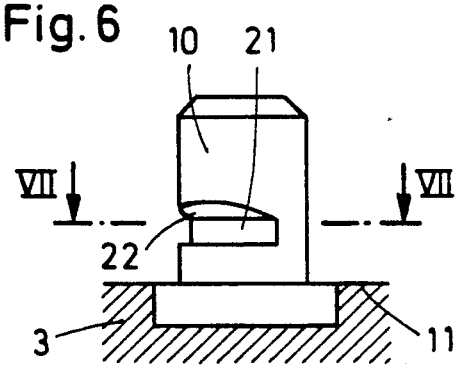
FIG. 6 is another embodiment of a clamping bolt as shown in FIG. 4.
Figure 7:
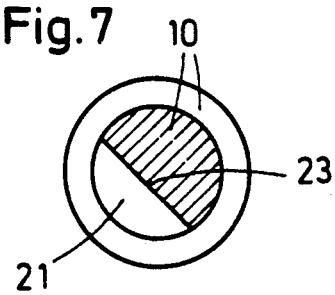
FIG. 7 is a sectional view taken along the line VII—VII in FIG. 6.

In the second embodiment of clamping bolt 10, illustrated in FIGS. 6 and 7, each clamping bolts has a single secant-like circumferentially extending cut forming the recess 21. The open side of the recess or cut faces the adjacent corner of the die holder 5 containing the holes 8. In this embodiment, each clamping bolt 10 is fixed to die 3, so that the planar inner boundary surface 23 of the recess or cut 21 extends at right angle to a bisector through the adjacent corner of the die 3 and also of the die holder 5.

It is also important that the wedge-shaped extension 19 at the inner end of the slide affording the locking action has an inclination with respect to the slide axis corresponding to the inclined surface 22 afforded by the cut 21 in the clamping bolt.

In this embodiment it is also assured that the die 3 can be positioned and secured to the die holder 5 in four different angularly rotated positions spaced 90° apart relative to the central axis through the contacting surfaces 9, 11.

While specific embodiments of the invention have been shown and described in detail to illustrate the application of the inventive principles, it will be understood that the invention may be embodied otherwise without departing from such principles.

I claim:

1. In an arrangement for securing a die to a die holder for use as a molding die in an injection molding machine comprising clamping bolts provided in pairs extending perpendicularly to a contacting plane between said die and die holder and located at a rear side of said die, holes in said die holder for receiving said clamping bolts, said die holder having side surfaces extending transversely of the contacting plane, passageways in said die holder extending from said side surfaces thereof to said holes, means located within said passageways for engaging said clamping bolts and securing said die to said die holder, said means comprises wedge-shaped slides and recesses in said clamping bolts for receiving said slides so that said die holder and die fit closely therein, means for displacing said slides into and securing said slides within said recesses, the improvement wherein said bolts are cylindrically shaped and have surfaces defining circumferentially extending secant-shaped said recesses in the outer surfaces thereof and each of said recesses in section in the axial direction of said clamping bolts having a shape corresponding to the wedge-shape of said slides, each of said recesses in said clamping bolts being further defined by two circumferentially extending cuts each having a planar surface spaced inwardly from the outer surface with the planar surfaces extending perpendicularly to one another and forming a corner angle corresponding to the corner angle of two adjacent said side surfaces of said die holder, and said wedge-shaped slides having an inner end for insertion into said recesses in said clamping bolt and said inner end having an inclined surface extending transversely of the axis of said passageways in said die holder.

2. In an arrangement for securing a die to a die holder for use as a molding die in an injection molding machine comprising clamping bolts provided in pairs extending perpendicularly to a contacting plane between said die and die holder and located at a rear side of said die, hole sin said die holder for receiving said clamping bolts, said die holder having side surfaces extending transversely of the contacting plane, passageways in said die holder extending from said side surfaces thereof to said holes, means located within said passageways for engaging said clamping bolts and securing said die to said die holder, said means comprises wedge-shaped slides and said clamping bolts defining recesses for receiving said slides so that said die holder and the die fit closely therein, means for displacing said slides into and securing said slides within said recesses, the improvement wherein said bolts are cylindrically shaped and each of said bolts has surfaces defining a circumferentially extending secant-shaped said recess in the outer surface thereof and the recesses in section in the axial direction of said clamping bolts have a shape corresponding to the wedge-shape of said slides, each said clamping bolt having a circumferentially extending cut in the outer surface thereof forming an opening facing an adjacent corner of said die holder and forming said recess in said clamping bolt, said bolt having a planar inner surface disposed at right angles to a bisector through the adjacent corner angle of said die holder, and said wedge-shaped slide has an inclined surface extending transversely of the axis of said passageway containing said slide and corresponding to an inclined surface of said recess.

3. An arrangement, as set forth in claims 1 or 2, wherein aid recesses in said clamping bolts in section extending in the axial direction of the clamping bolts has a trapezoidal shape and said trapezoidal shape has a first surface closer to said contacting plane when said clamping bolt is inserted into said hole in said die holder extending parallel to said contacting plane, and a second surface spaced further from said contacting plane and inclined at an acute angle relative to the axis of said clamping bolt and said inclined surface corresponds to an inclined surface in the recess of said clamping bolt.

4. An arrangement, as set forth in claims 1 or 2 wherein at least one said hole is located along and adjacent to one said side surface of said die holder, and at least one said clamping bolt is located adjacent to a corresponding side surface of said die, wherein said holes and clamping bolts enable the securement of said die to said die holder in a number of angularly rotated positions relative to an axis perpendicular to said contacting plane.

* * * * *